(12) United States Patent
Smith et al.

(10) Patent No.: US 6,452,905 B1
(45) Date of Patent: Sep. 17, 2002

(54) BROADBAND SWITCHING SYSTEM

(75) Inventors: Avril J Smith, Oxford; John L Adams, Felixstowe, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/913,270

(22) PCT Filed: Mar. 8, 1996

(86) PCT No.: PCT/GB96/00536

§ 371 (c)(1),
(2), (4) Date: May 4, 1998

(87) PCT Pub. No.: WO96/27966

PCT Pub. Date: Sep. 12, 1996

(30) Foreign Application Priority Data

Mar. 8, 1995 (EP) ............................................... 9539524

(51) Int. Cl.[7] .............................. H04J 3/16; H04L 12/56
(52) U.S. Cl. ............................... 370/236.1; 370/395.2; 370/395.4
(58) Field of Search ................................. 370/230, 232, 370/233, 234, 235, 236, 236.1, 395.2, 395.21, 395.4, 395.41, 395; 709/232, 233, 235

(56) References Cited

U.S. PATENT DOCUMENTS

| 5,179,556 A | 1/1993 | Turner |
| 5,231,631 A | 7/1993 | Buhrke et al. |

(List continued on next page.)

FOREIGN PATENT DOCUMENTS

| EP | 0413488 | 2/1991 |
| EP | 0487235 | 5/1991 |
| EP | 0448073 | 9/1991 |
| EP | 0452223 A2 | 10/1991 |
| EP | 0468126 A | 1/1992 |
| EP | 0468802 | 1/1992 |
| EP | 0522391 | 1/1993 |
| EP | 0535860 | 4/1993 |
| EP | 0603099 | 6/1994 |
| EP | 0794517 A | 9/1997 |
| FR | 2702291 A | 9/1994 |
| WO | 96 03717 A | 2/1996 |
| WO | 97 15889 A | 5/1997 |

OTHER PUBLICATIONS

Crocetti et al, IEEE INFOCOM '91, vol. 3, Apr. 7, 1991, Bal Habor, pp. 1145–1150 "Bandwidth Advertising for MAN/ATM Connectionliess Internetting".

(List continued on next page.)

*Primary Examiner*—Min Jung
(74) *Attorney, Agent, or Firm*—Nixon & Vanderhye P.C.

(57) ABSTRACT

In a broadband switching system for the switching of asynchronously transferred cells of data, a dynamic bandwidth controller (DBC) controls the application of data cells to an input port of the system. The data cells are supplied by a number of transmitting end-systems. When an end-system begins transmitting data cells, the DBC detects the presence of incoming cells and requests bandwidth from a connection admission control (CAC) forming part of the system. The switching system stores a table associating a number of signal sources connected to the input port with respective predetermined maximum transmission times and maximum transmission rates for the sources. When arrival of cells at the input port from one of the source is detected, the DBC and CAC operate together to allocate sufficient bandwidth in the switching system to allow the respective message size to be transmitted within the respective maximum transmission time. A guaranteed minimum rate of transmission is also guaranteed for the source.

10 Claims, 11 Drawing Sheets

U.S. PATENT DOCUMENTS

| | | | |
|---|---|---|---|
| 5,258,979 A | | 11/1993 | Oomuro et al. |
| 5,265,091 A | * | 11/1993 | van Landegem ............ 370/232 |
| 5,271,005 A | | 12/1993 | Takase et al. |
| 5,280,470 A | * | 1/1994 | Buhrke et al. .............. 370/232 |
| 5,289,462 A | | 2/1994 | Ahmadi et al. |
| 5,291,481 A | | 3/1994 | Doshi et al. |
| 5,313,454 A | * | 5/1994 | Bustini et al. .............. 370/236 |
| 5,315,586 A | | 5/1994 | Chavillat |
| 5,367,517 A | | 11/1994 | Cidon et al. |
| 5,377,327 A | | 12/1994 | Jain et al. |
| 5,448,559 A | | 9/1995 | Hayter et al. |
| 5,455,826 A | * | 10/1995 | Ozveren et al. ............ 370/232 |
| 5,495,576 A | | 2/1996 | Ritchey |
| 5,528,592 A | | 6/1996 | Schibler et al. |
| 5,533,009 A | * | 7/1996 | Chen .......................... 370/232 |
| 5,570,355 A | | 10/1996 | Dail et al. |
| 5,570,360 A | * | 10/1996 | Klausmeier et al. ........ 370/236 |
| 5,577,035 A | | 11/1996 | Hayter et al. |
| 5,604,742 A | | 2/1997 | Colmant et al. |
| 5,633,861 A | * | 5/1997 | Hanson et al. .............. 370/232 |
| 5,636,212 A | | 6/1997 | Ikeda |
| 5,677,906 A | | 10/1997 | Hayter et al. |
| 5,696,764 A | | 12/1997 | Soumiya et al. |
| 5,729,471 A | | 3/1998 | Jain |
| 5,764,241 A | | 6/1998 | Elliott |
| 5,880,733 A | | 3/1999 | Horvitz |
| 5,920,261 A | | 7/1999 | Hughes |
| 5,940,370 A | | 8/1999 | Curtis et al. |
| 5,977,978 A | | 11/1999 | Carey |
| 5,982,771 A | | 11/1999 | Caldara et al. |
| 5,986,675 A | | 11/1999 | Anderson |
| 6,011,804 A | | 1/2000 | Bertin et al. |
| 6,018,748 A | | 1/2000 | Smith |
| 6,167,378 A | | 12/2000 | Webber |
| 6,189,019 B1 | | 12/2000 | Blumer |

OTHER PUBLICATIONS

Saito et al, Transactions of the Institute of Electronics, Information and Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

Caho et al, International Switching Symposium, vol. 1, Oct. 25 & 30, 1991, Yokohama, pp. 1229–1233, "A General Architecture for Link–Layer Congestion Control in ATM Networks".

* cited by examiner

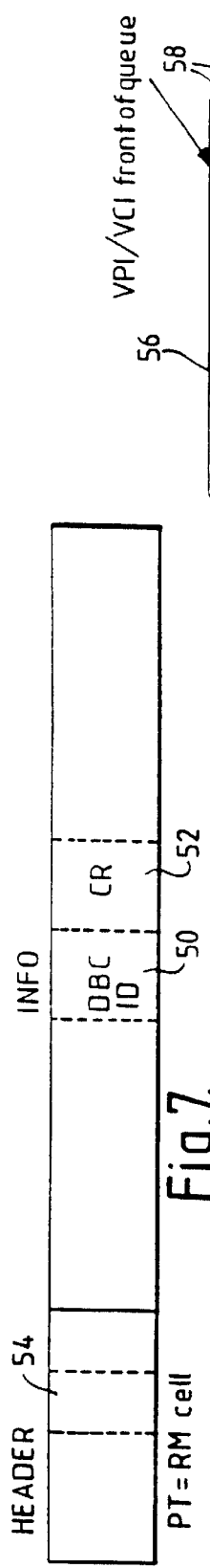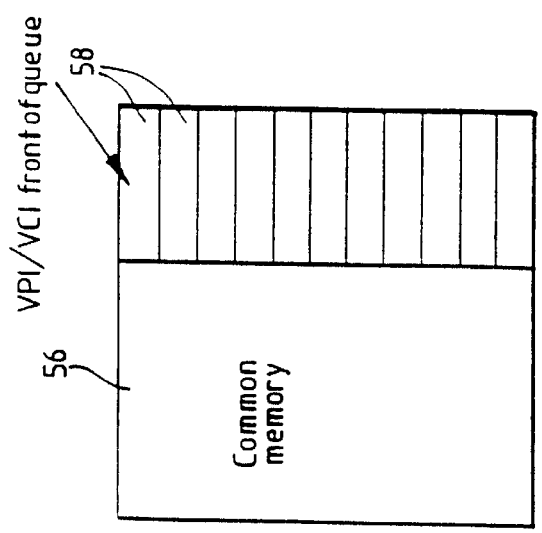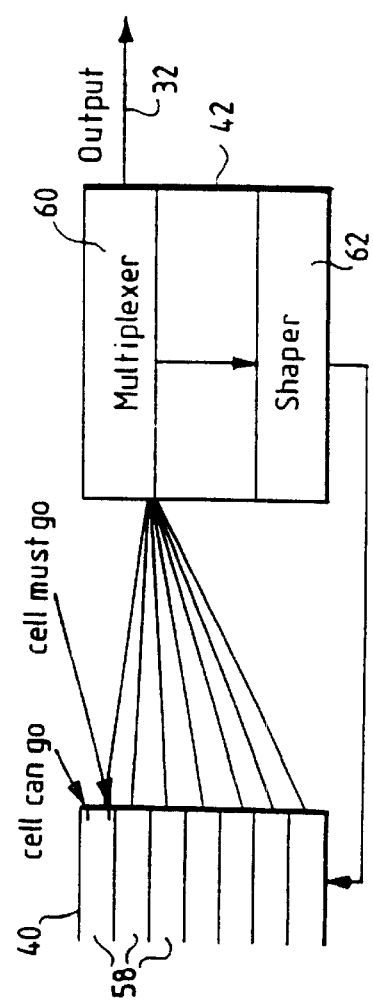

BROADBAND SWITCHING SYSTEM

RELATED APPLICATIONS

This application is related to copending commonly owned applications:

U.S. Ser. No. 08/619,653, filed Mar. 22, 1996, now U.S. Pat. No. 5,784,358; U.S. Ser. No. 08/983,268, filed Sep. 10, 1997; U.S. Ser. No. 08/999,749, filed Sep. 10, 1997; and U.S. Ser. No. 09/029,323, filed Feb. 23, 1998.

BACKGROUND OF THE INVENTION

1. Field of the Invention

This invention relates to a broadband switching system for the switching of asynchronously transferred data cells, and to a method of switching asynchronously transmitted data cells.

2. Related Art

Broadband switching networks for switching asynchronously transferred cells are known, in which a predetermined level of bandwidth is allocated to a transmission channel connecting a first customer to a second customer. In some of these known systems, a communications channel is provided over a significant period of time, effectively of the leased-line type, and manual measures are implemented in order to set up such a connection or to modify a connection according to the particular terminations and the level of traffic being conveyed. Consequently, it is usual for customers to incur a fixed rate charge as part of the overall charge for the connection, resulting in payment being made irrespective as to whether the connection is being used or not.

Alternative systems have been proposed or are available. In particular, it is possible for connections to be established on a dial-up basis, requiring termination equipment to be provided with facilities for establishing connections by issuing signalling commands and responding to similar commands issued by the network.

The use of permanent circuits to support a private communications network is widespread. The demand for such circuits is expected to grow to include broadband rates above 2 Mbit/s, the circuits carrying traffic multiplexed from sources which are inherently bursty, possibly together with traffic which is transmitted at constant bit rates and is delay sensitive, such as voice transmission and constant bit-rate video.

Asynchronous transfer mode (ATM) cells all have a fixed information field of forty eight octets which can carry customer traffic or customer-originating control information (signalling). These two types of data transmission are distinguished by setting virtual path (VP) and vertical circuit (VC) values in the cell headers. Another field provided in the ATM header is known as cell loss priority, which enables low priority cells to be distinguished from high priority cells. In the event of congestion, the low priority cells may be discarded first.

For private circuits within an ATM based network, the desired route, the required bandwidth, and the quality of service (QOS) are set up using network management procedures. The private circuits are known as permanent virtual circuits (PVCs) because there is no actual physical circuit, only a VP/VC value or "label" which is associated with information stored in the switches to determine the route and preserve the bandwidth and QOS requirements.

A disadvantage of all known permanent circuits is that the bandwidth remains assigned to the circuit, even when the customer has nothing to transmit. This means that the customer may have to pay higher charges than would be obtained if the bandwidth was only made available when needed. The assumption being made here is that charging is related to reserved bandwidth, and this is not necessarily correct in terms of the way public network operators may choose to charge for virtual circuits. However, it is expected that charging based on reserved bandwidth will become a significant factor in the future.

A common practice is to set up a permanent virtual circuit so that it is only available during certain hours of the day, or during certain days of the week. A difficulty with this approach is that it does not allow the customer to change the pattern of usage quickly, and it may only crudely reflect the usage required by the customer.

A second proposal has been to provide the customer with a separate communications channel to the network management plane, thereby allowing a permanent virtual circuit to be reconfigured. A difficulty with this approach is that some time delay will be incurred before the customer can start to use the virtual circuit.

A third proposal is to introduce equipment at every switching point in the network that recognises a fast resource management cell, indicating that bandwidth should now be assigned to the circuit. A difficulty with this approach is that there is no internationally agreed standard for a bandwidth-requesting cell that would be recognised by the switching equipment produced by the various manufacturers.

SUMMARY OF THE INVENTION

According to one aspect of the invention, a broadband switching system having at least one ingress for connection to a respective signal source and at least one egress for connection to a selected signal receiving system, the switching system having at least one switch for transmitting information-carrying asynchronously transferred data cells from the ingress to the egress, system control means for accepting and establishing a connection between the ingress and the egress via the said switch, and bandwidth control means arranged to detect the cells received at the ingress, and, automatically in response to such cell detection, to cause the system control means to allocate sufficient bandwidth to permit transmission of a predetermined number of cells within a predetermined time period.

Preferably, the system includes table storing means for a table associating the predetermined time period with the signal source, the time period being a predetermined maximum transmission time for a message comprising a group of the predetermined number of cells, the bandwidth control means having means for recognising the source of the detected cells thereby to identify the maximum transmission time associated with the detected cells.

In this way it is possible to alter the bandwidth available in the system for cells intended for a given path dynamically, avoiding the need to signal a request for bandwidth prior to being able to transmit cells onto the system and to provide a guaranteed maximum transmission time.

Preferably, the stored table further includes a message size value, the size value being associated with a respective signal source and being a predetermined maximum number of cells which form a message. Thus, from the stored maximum message size value and maximum transmission time, the system control means is able to calculate the cell rate (and equivalent bandwidth) required to complete the job (transmission of the message) in time. These two items of information typically are pre-registered by a customer.

The stored table may further include a bandwidth value, the bandwidth value being a predetermined maximum bandwidth allocation associated with a respective signal source.

Again, this value will typically be pre-registered and will usually correspond to the maximum transmission bandwidth capability of the signal source. This avoids the possibility of a signal source being offered a bandwidth capacity that it cannot fully use which if the system is expecting the bandwidth to be fully used, could result in the predetermined number of cells not being transmitted within the time period and also would result in incomplete use being made of the available bandwidth on the system.

Optionally, the maximum transmission time may be calculated according to a predetermined finishing time for the transmission of a message to the egress. Thus, a customer may send a message specifying a time by which it must arrive. The system control means and/or the bandwidth controller may be operable to calculate the maximum transmission time based on the current time and the predetermined finishing time.

Preferably, the system control means is arranged to calculate the bandwidth required to permit transmission of a message in the time period associated with the recognised signal source.

The bandwidth control means may be arranged periodically to monitor the number of cells of a particular message that have already been sent and to communicate the cell count to the system control means. The system control means may then decide whether the bandwidth allocated to the signal source for the transmission of that message needs to be adjusted to ensure that transmission occurs within the predetermined maximum transmission time.

It will be appreciated that a signal source may not necessarily make full use of the bandwidth allocated to it and in such a case, it is not sufficient that the system control means allocate sufficient bandwidth for the message to be transmitted in time, it is necessary for the system control means to monitor the progress which has been made in transmitting the message. The counting of cells by the bandwidth controller is one way of doing this.

The bandwidth controller may be arranged to detect periods of inactivity for a signal source, to measure the length of such inactive periods and to deem cells received at the ingress following a period of inactivity which exceeds a predetermined timeout period, to be the beginning of a new message.

Preferably, the bandwidth control means are arranged to detect the rate at which cells are supplied to the input port of the system, and bandwidth is requested from the system control means generally on the basis that the transmitting signal source should be allocated as much bandwidth as is available on the system for the indicated route. Such bandwidth will be allocated depending on the level of traffic in the system at the time the system control means is caused to allocate bandwidth. However, in the preferred embodiment of the invention, the rate at which cells are supplied to the ingress from a given signal source is monitored and, if the allocated bandwidth is more than that required to transmit the cells at the monitored rate, the system control means are caused by the bandwidth control means to allocate less bandwidth to these cells, e.g. after a predetermined time interval, thereby making bandwidth available to other customers.

The bandwidth control means may include feedback means arranged to transmit a maximum output cell rate signal back to the signal source, the indicator signal indicating a cell rate which depends on or matches the allocated bandwidth.

The bandwidth control means may be arranged also to read a bandwidth-identifying portion of the incoming cells and to cause the system control means to allocate bandwidth to the cells according to the identified bandwidth. The bandwidth control means may also be arranged to limit the rate at which incoming cells are accepted onto the system on the basis of a default bandwidth until allocation of bandwidth by the system control means has occurred. In this situation, buffering is provided in the bandwidth control means to buffer cells whilst bandwidth is being allocated. Such buffering may be used on other occasions when an signal source is transmitting at a higher rate than the rate capable of being accepted by the system at a given time. Indeed, it is preferable for the buffer to have means for detecting when it is filled to a predetermined threshold level, the feedback means being responsive to the buffer to cause a retransmission of a cell rate indicator signal to the signal source when connected to the ingress. Preferably, detection of filling of the buffer to a predetermined threshold level causes a reduced cell rate indicator signal to be transmitted to the signal source, the signal source having the facility then to reduce its cell rate to avoid buffer overflow and consequent loss of data.

The bandwidth control means of the preferred embodiment are arranged to cause automatic allocation of bandwidth for cells received from a number of signal sources, and may include an activity detector and a controller, the activity detector being operable to detect the incoming cells and to identify the signal source transmitting the detected cells, with the controller being operable in response to the said detection and identification to transmit a bandwidth request message to the system control means to allocate a level of bandwidth specifically to the cells transmitted by that identified signal source.

The activity detector may include a cell counter for counting cells received from respective signal sources coupled to the bandwidth control means. The cell count so obtained, may be used to generate charging signals for customer billing and other purposes.

The invention also includes, according to another aspect thereof, a method as claimed in claim 10 of the accompanying claims.

BRIEF DESCRIPTION OF THE DRAWINGS

The invention will now be described in greater detail, by way of example, with reference to the accompanying drawings, in which:

FIGS. 6-1 and 6-2 are SDLs for the controller module of FIG. 4;

FIG. 7 is a diagram of a resource management (RM) data cell;

FIG. 9 is a diagram of a buffer for the bandwidth controller of FIG. 4;

FIG. 11 is a block diagram of a shaper/multiplexer module and its connection to the buffer of FIG. 6;

FIGS. 12-1, 12-2, and 12-3 are SDLs for the shaper/multiplexer module.

DETAILED DESCRIPTION OF EXEMPLARY EMBODIMENTS

In its preferred form, the invention is concerned with a broadband switching network which may form part of or may constitute a public switching network for the transmission of asynchronously transferred data cells between end-systems.

Figure 1:
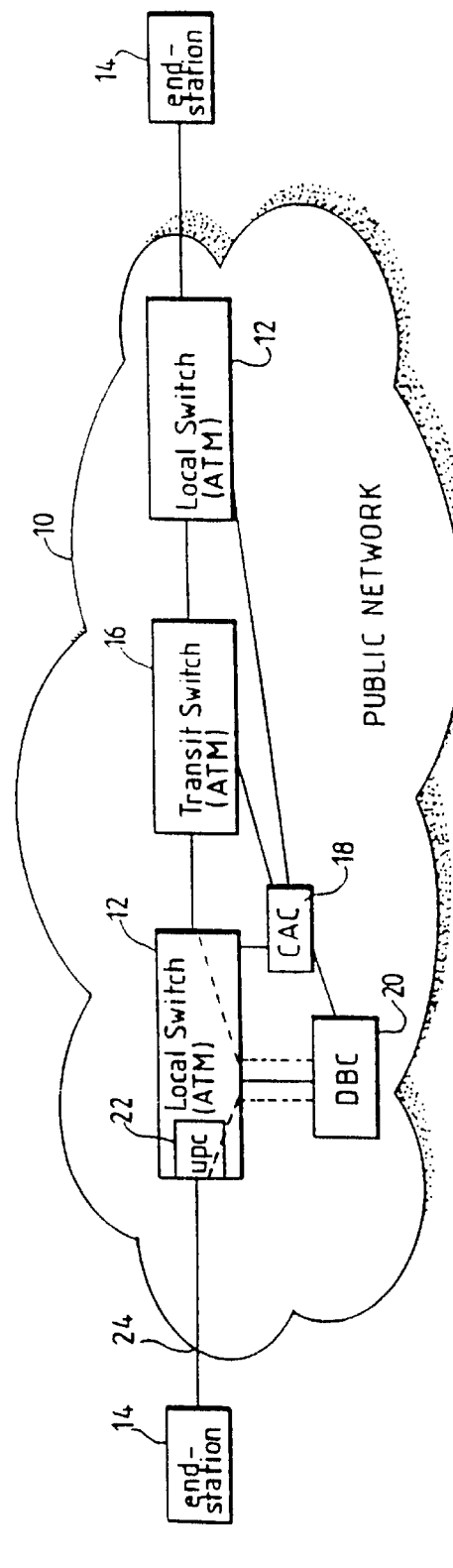
FIG. 1 is a diagram of a broadband switching system in accordance with the invention.

Referring to FIG. 1, the public network 10 has a plurality of switches operable in asynchronous transfer mode (ATM). In this simple example, the switches include two local switches 12 each having a port for connection to a respective end-system 14, and a transit switch 16 interconnecting the local switches 12. Associated with the switches is a connection admission control function (CAC) 18 and a dynamic bandwidth controller (DBC) 20 for controlling traffic entering the network through one of the local switches 12. This switch 12 also includes a usage parameter control device 22 for dynamically altering the priority of data cells received at the input port 24 of the network from the end-system 14.

It will be understood that, in practice, the network 10 will include large numbers of local and transit switches 12, 16 and several DBCs 20 all interconnected to form a network having a plurality of ports such as port 24 for connecting several end-systems such as end-system 14. Using the DBC 20, the public network 10 is able to provide an available bit rate (ABR) service, the DBC acting to detect incoming cells supplied to the input port 24 and, automatically in response to this detection, to cause the CAC 18 to allocate sufficient bandwidth for the transmission of the cells to the destination end-system within a predetermined time period. Generally, end-systems 14 requiring the ABR service are allocated to a fixed DBC 20. There may be more than one DBC 20 for each local ATM switch 12. In the case of a fault, end-systems can be rerouted to a standby DBC (not shown).

Data is transmitted in the form of asynchronous transfer mode (ATM) cells, each having an information field of forty-eight octets, in addition to a header of five octets, which includes information facilitating transmission through the network itself. Thus, routing is controlled on a cell-by-cell basis and a plurality of transmission paths and time multiplexed slots may be employed for any particular link. ATM cells are, therefore, transmitted via virtual paths and virtual circuits, as defined by the header information.

The virtual paths and virtual circuits are identified by a virtual path identifier (VPI) and a virtual channel identifier (VCI) in the five octet header which effectively defines the connection between the end-systems so that cells forming part of a common message will be transmitted over the same connection. ABR traffic enters the public system 10 by routing cells according to their VPIs and VCIs through the DBC 20 and then out to external routes, as shown in FIG. 1. From the DBC 20, the traffic on each virtual path and virtual channel is restricted to a cell rate (which will be referred to hereinafter as "CR"), determined by the CAC 18.

Figure 2:
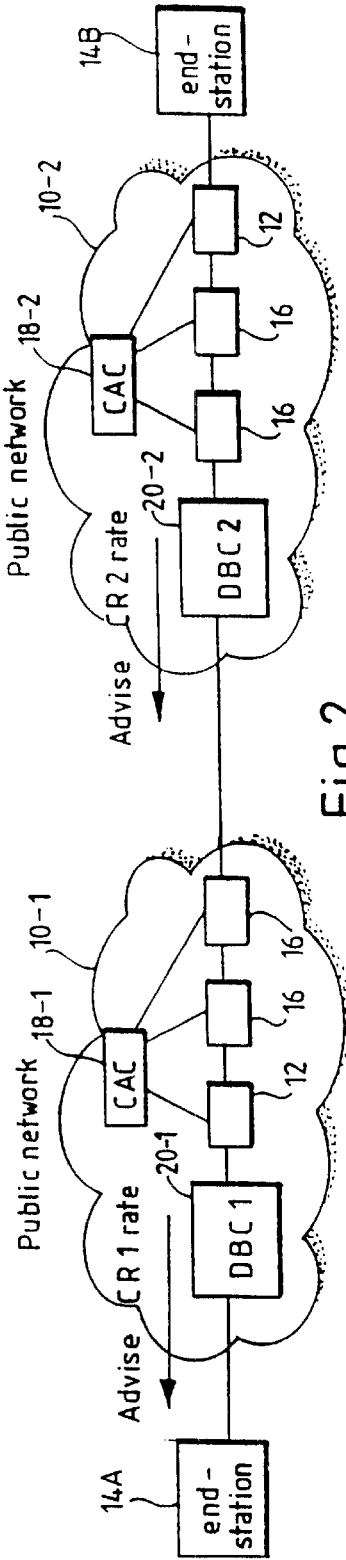
FIG. 2 is a diagram of another broadband switching system in accordance with the invention.

An alternative illustrative arrangement is shown in FIG. 2. In this case, end-system 14A is subject to the control of more than one DBC. In fact, the connection between two end-systems 14A, 14B is routed through two public networks 10-1 and 10-2. Each network 10-1, 10-2 has its own DBC 20-1, 20-2 responsible for restricting traffic entering the network according to the bandwidth allocated by its own connection admission control function (CAC) 18-1, 18-2. Each DBC 20-1, 20-2 is also responsible for advising the end-system 14A of the current applicable CR.

In the systems of both FIG. 1 and FIG. 2, a customer pre-registers the maximum transmission rate of their end-system, the maximum time for the transmission of a file and optionally the maximum file size that they wish to send. A customer may alternatively register a predetermined time of arrival.

The customer is not bound to send this file size nor at the maximum transmission rate and may send a smaller file than the maximum size and/or at a slower rate than the maximum rate. The CAC 18, 18-1, 18-2 then allocates bandwidth to the cells which is sufficient to permit the file to be transferred within the maximum transmission time. This allocation is then indicated to the DBC 20, 20-1, 20-2 which communicates the CR to the transmitting end-system 14.

It is possible for a single dynamic bandwidth controller (DBC) to be shared by several end-systems or signal sources. For example, referring to FIG. 3, a DBC 20-3 is shown connected to a broadband ATM switch 12-3 forming part of the network 10, the traffic of three sources 14C being handled using an output buffer 28. The number of sources which can be handled by the DBC 20-3 is determined by the link rate L (i.e. there must be not so many sources that it is always the link rate L which is the limiting factor determining the available rate.) The aggregate cell rate of the ABR traffic from the sources 14C must not exceed L. This implies that if the traffic from each source is bursty, there may be times when the output buffer 28 is congested. This can be avoided by supplementing the cell rate (CR) feedback to the end-systems 14C with generic flow control (GFC) signals which operate to stop all transmissions from each source immediately.

Figure 3:
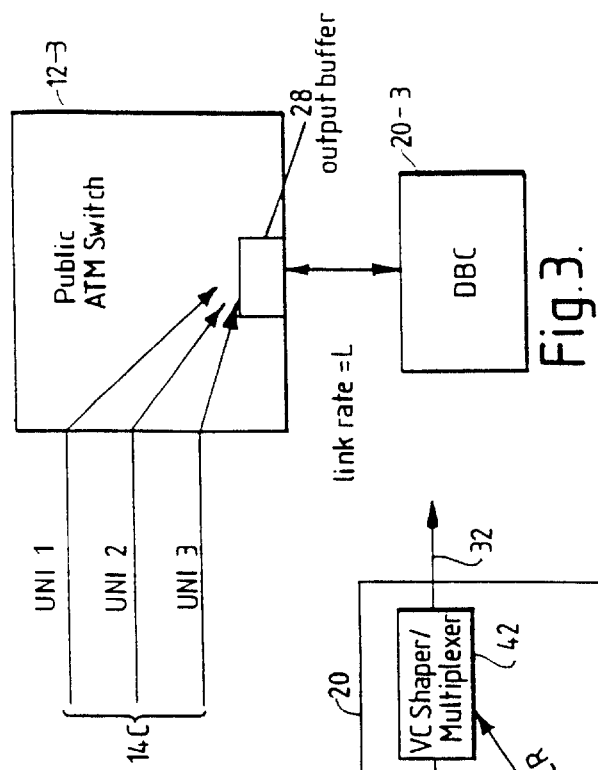
FIG. 3 is a diagram of part of a broadband switching system showing how a single bandwidth controller can be shared by several end-systems.

Whenever the dynamic bandwidth controller (DBC) is incorporated in the arrangements of FIGS. 1, 2, or 3, its main functions are as follows.

Firstly, it provides buffering of incoming data cells, the degree of buffering at any given time being determined according to the transmission containing the cells, the transmission being identified by the VPI and VCI information referred to above. The DBC further controls or "shapes" the traffic fed to the network 10 so as to be equal to the current CR applicable to that particular transmission, the CR depending on the allocated bandwidth.

The allocated bandwidth, and hence the CR, for any given transmission is determined by the CAC 18 (see FIG. 1) on the basis of determining the route to be followed by the transmission and assigning a fair share of the available capacity on the route based upon the known number of active transmissions and based upon the need to finish a job within a predetermined maximum time.

When a transmission begins it is detected in the DBC, which immediately transmits a low default CR to the relevant end-system 14 (see FIG. 1). Thus a connection is always allowed but it should be noted that the low default CR may have a value of zero. The reduction to the low default CR ensures that a newly active transmitting source does not cause overload in the system 10 before the CAC 18 has been able to allocate bandwidth and derive a CR for that transmission. Such overload would typically cause cell loss for that transmission. The traffic associated with that transmission leaving the DBC 20 is shaped to correspond to the default CR. This is part of a second main function of the DBC, i.e. to send a feedback signal to the end-system for the purpose of controlling its transmitted cell rate. Indeed, each time the CAC 18 derives a new CR for a transmission, a CR advice signal is fed back to the end-system.

The pre-transmission buffering of the DBC is used to allow a cooperating end-system sufficient time to adjust its output to the latest CR feedback advice. This implies that there is sufficient buffering in the DBC to allow excess cells to enter for a period at least equal to the round trip delay between the DBC and the end-system. If cells continue to arrive from the end-system 14 at a rate greater than the advised feedback CR (for instance, because the CR was lost en route, or because of a faulty end-system) the excess cells will be dropped in the DBC by overflow of the buffer.

In the preferred DBC, it is also possible to include fault tolerance by making use of a buffer threshold. When the stored cells relating to a given transmission reach the threshold, retransmission of the CR advice feedback to the end-system is triggered. This feature is useful also as a mechanism for policing end-systems to prevent inefficient use of bandwidth, whether due to a faulty terminal or due to deliberate non-compliance with contracted transmission rules. In this way, interference with the quality of service provided for other, compliant end-systems is prevented. In effect, the DBC defines the ABR traffic contract with the network 10.

The modules of the DBC 20 will now be described in more detail with reference to FIG. 4.

Figure 4:
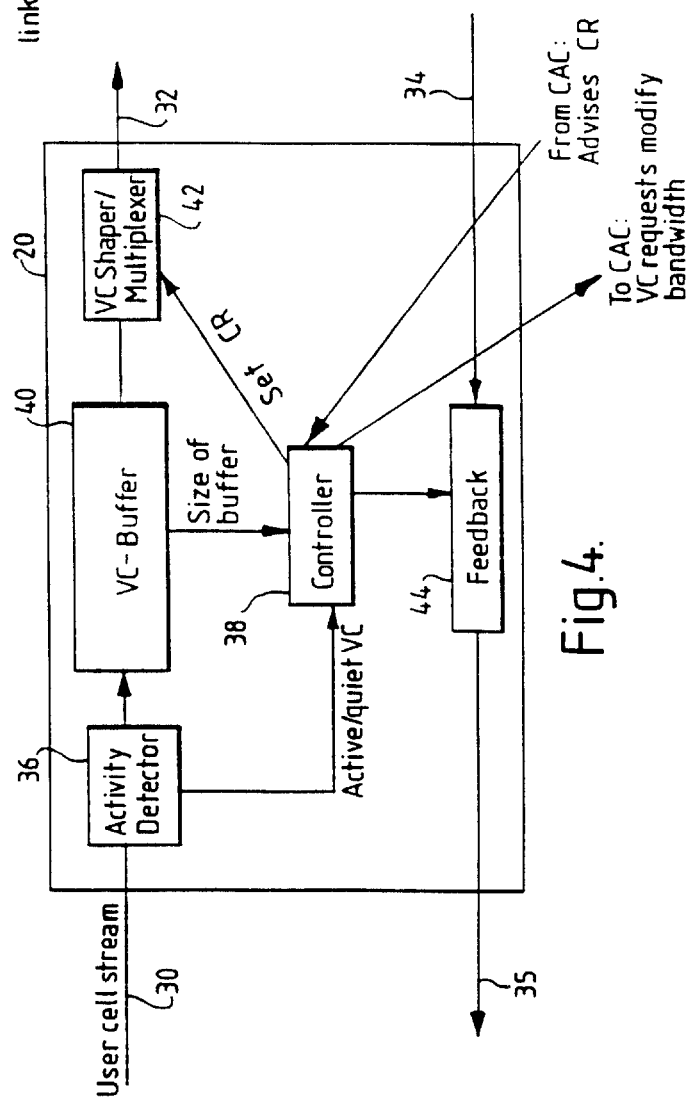
FIG. 4 is a block diagram of a bandwidth controller for use in the systems of FIGS. 1 and 2.

The DBC 20 is shown in FIG. 4 is a discrete unit having an input port 30 for receiving asynchronously transmitted data cells, an output for feeding data cells onto a switch 12 or 16 (see FIGS. 1 and 2) forming part of the switching network 10. The unit also has another input 34 for receiving messages back from the switch 12 or 16 and a feedback output 35 for transmitting feedback messages to the end-system 14 (shown in FIG. 1). Although the DBC 20 is shown as a discrete unit, it will be appreciated that FIG. 4 can be regarded as a functional diagram representing a subset system of a larger data processing unit, much of which may be embodied as software functions.

Incoming cells on input 30 arrive as a user cell stream which is fed firstly to an activity detector 36. The purpose of the activity detector is to provide state information to a controller module 38 about each received transmission, each transmission being identified by its VPI and VCI contained in the cell headers. A transmission is labelled active by the activity detector 36 if it was previously quiet and a cell having the appropriate VPI and VCI values is observed to be transmitted from an end-system to input 30. Synchronisation of the activity detector 36 with the start of a cell header may be carried out using an error check field contained in the cell header. The error check field, provides a degree of redundancy, by which error checking may be performed on the header information. Thus, the principal reason for providing the header error check field is to ensure that the header information is correct, thereby ensuring that cells are not transmitted to erroneous addresses.

A transmission is considered to be in an inactive state if it was previously active and no cell having the appropriate VPI and VCI has been detected for a period of time t.

Activity detector 36 maintains a timer and state table for each VPI/VCI value pair. Preferably, t is set to be several seconds so that active-inactive-active transitions relating to any given VPI/VCI value pair which are of the order of several milliseconds remain undetected so that the transmission is indicated as remaining in the active state under these conditions. This has the effect of reducing the frequency of messages sent by the DBC 20 to the CAC 18 at some expense to lowering utilisation of the network.

Another function of the activity detector 36 is that of counting the cells for transmission during an interval after receiving a "start cell count" request from the controller 38. This information can be used, for example, for charging purposes and also by the controller 38 for assessing the actual cell rate of received transmissions.

Figure 5:
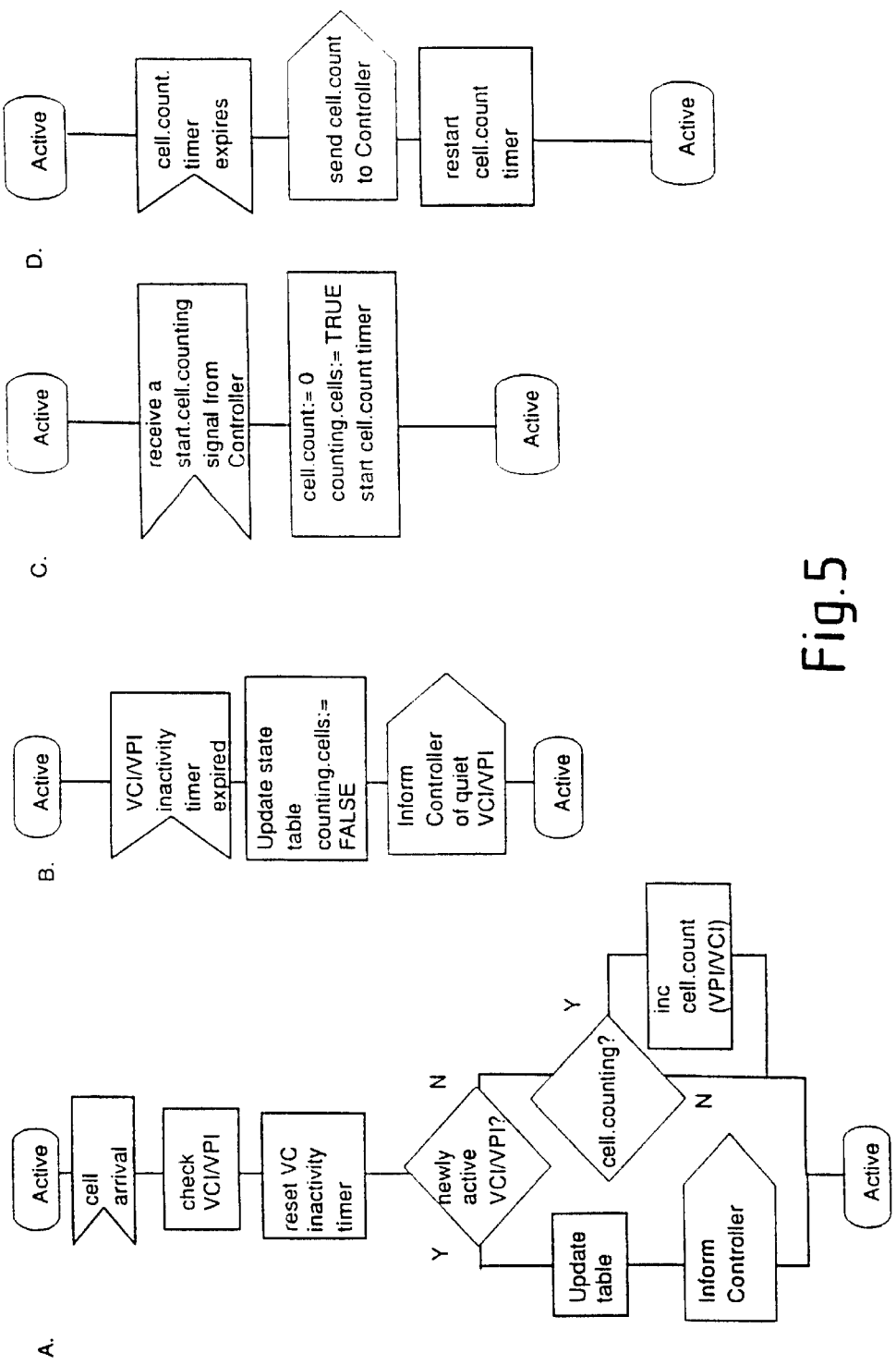
FIG. 5 is a specification description language diagram (SDL) for the activity detector module shown in FIG. 4.

Pseudocode for the activity detector is listed below and the corresponding SDL appears in FIG. 5.

```
BEGIN {cell arrival}
    cell arrival from end-system
    read VC
    reset VC inactivity timer
    IF VC is newly active THEN
        update state table
        advise CONTROLLER of newly active VC
    ELSE IF counting.cells(VPI/VCI) THEN
        increment cell.count(VPI/VCI)
    ELSE
        do nothing
END BEGIN {VC timer expires}
    VC inactivity timer expires indicating quiet VC
    update state table
    advise CONTROLLER of quiet VC
    counting.cells:=FALSE
END BEGIN {receive a start.cell.count signal}
    receive a start.cell.count(VPI/VCI) signal from CON-
        TROLLER
    cell.count(VPI/VCI):=0
    counting.cells:=TRUE
END BEGIN {cell.count timer expires}
    cell.count timer expires
    send cell.count(VPI/VCI) to CONTROLLER
    restart cell.count timer
END
```

It will be seen that, as far as the incoming user cell stream is concerned, the activity detector 36 reads the VPI/VCI values in each cell header of the arriving cell stream, and this information is used to update the state table which it maintains for each VPI/VCI value pair. As far as communication with the controller 38 is concerned, the detector 36 informs the controller of a change of state of any VPI/VCI value pair. The controller can inform the activity detector of the timer value t to be used.

Preferably, the same value of t is used for all VPI/VCI value pairs. Cell count information is sent to the controller 38 by the activity detector 36 at the end of each timer expiry. The cell count may be passed on to the CAC 18 by the controller 38 as described below, in order to determine how much of a job has been transmitted so far.

The cells of the user cell stream arriving on input 30 are transmitted without delay to a buffer module 40 where they are stored in first-in, first-out (FIFO) buffer queues, each queue comprising cells having a given VPI/VCI value pair. The detector 36 is non-specific to cell type. Thus, the arrival of any data cells will be detected and can potentially affect the activity state associated with a VPI/VCI value pair, independently of the existence or absence of control or management cells. Buffered cells are fed from the buffer 40 to a shaper multiplexer module 42 prior to being fed to an ATM switch via output 32. Operation of the buffer and shaper/multiplexer modules 40, 42 will be described in more detail below. For the time being, it is sufficient simply to say that the buffer module is capable of signalling to the controller 38 when any buffer queue has reached a predetermined buffer fill threshold. The shaper multiplexer module 42 is responsible for removing cells from the buffer module 40 and transmitting them onwards towards their destination. It includes a multiplexer function and the shaper stores a CR value for each VPI/VCI value pair so that the cell stream fed from the output is shaped to ensure that the capacity of the respective path through the network for each transmission, as determined by the allocated bandwidth, is not exceeded. The controller 38 also controls a feedback module 44 for receiving feedback messages from the network on input 34 and from the controller 38 itself, for onward transmission to the end-system 14 via output 35. The functions of the buffer, shaper/multiplexer, and feedback modules 40, 42 and 44 will be described in more detail below. The controller 38 will be considered first.

The purpose of the controller 38 is to signal to the CAC 18 that an ABR type transmission identified by any given VPI/VCI value pair should have bandwidth in the system allocated or re-negotiated. In this embodiment, the controller transmits a bandwidth re-negotiation signal to the CAC 18 which is recognised by the CAC 18 as a signal in respect of a transmission which must be completed within the preregistered maximum time. The CAC therefore advises the controller of a bandwidth which will achieve this (the CAC bandwidth allocation strategy is described below).

The new CR is sent via feedback, to the end-system and is also sent to the shaper module 42. The controller 38 instructs the activity detector 36 to perform a count of cells received and periodically, the controller 38 sends a cell count signal based on the cell count produced by the activity detector 36 to the CAC 18.

The controller 38 is also responsible for monitoring the actual sending rate of users in cases of transmissions having seized a large effective capacity. This is done by initializing a timer in the activity detector 36 which may have a time-out period of a few seconds, and at the end of this period the activity detector delivers a cell count to the controller 38. This information is processed to estimate the system capacity equivalent to the actual sending rate of the user. If this capacity is substantially less than the currently allocated capacity, it may imply that the user is attempting to keep a large capacity simply by sending a relatively slow trickle of cells to input 30 to keep the activity detector status for the relevant transmission in the active state. Clearly this situation results in inefficient use of the network, and the following steps are performed by the controller 38 when there is a substantial mismatch in the capacity assigned and currently used. Firstly, the shaper 42 is immediately re-set to drop to the actual CR for the relevant VPI/VCI value pair. Next, the feedback module 44 is commanded to issue the actual CR to the user via output 35. Finally, the controller 38 sends a bandwidth re-negotiation signal to the CAC, the signal including a bandwidth value which is set equal to the current equivalent capacity being used by the user. This signal is then interpreted by the CAC as an option to free capacity for other customers. As an alternative, the mismatch may be dealt with by assigning to the shaper and the feedback modules 42, 44 a default CR rather than the actual CR.

As mentioned above, the controller 38 is also arranged to receive a signal from the buffer module 40 when the buffer fill for a given VPI/VCI value pair has reached a given threshold. This signal causes the controller 38 to command the feedback module 44 to issue a so-called resource management (RM) cell, which will be described in more detail hereinafter. The controller 38 may also receive a DBC identity value for each new transmission (identified by a new VPI/VCI value pair) which is established, this DBC identity value being received from the CAC. Alternatively, the DBC may use a default identity if none is supplied.

Figures 1, 6:
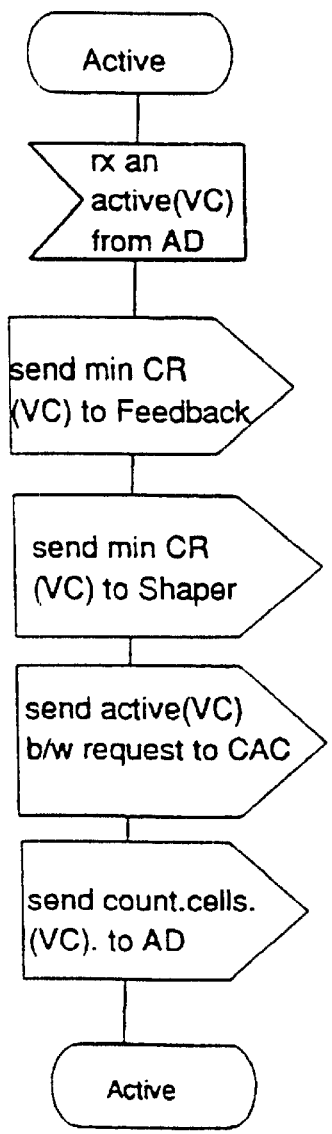
Figures 2, 6:
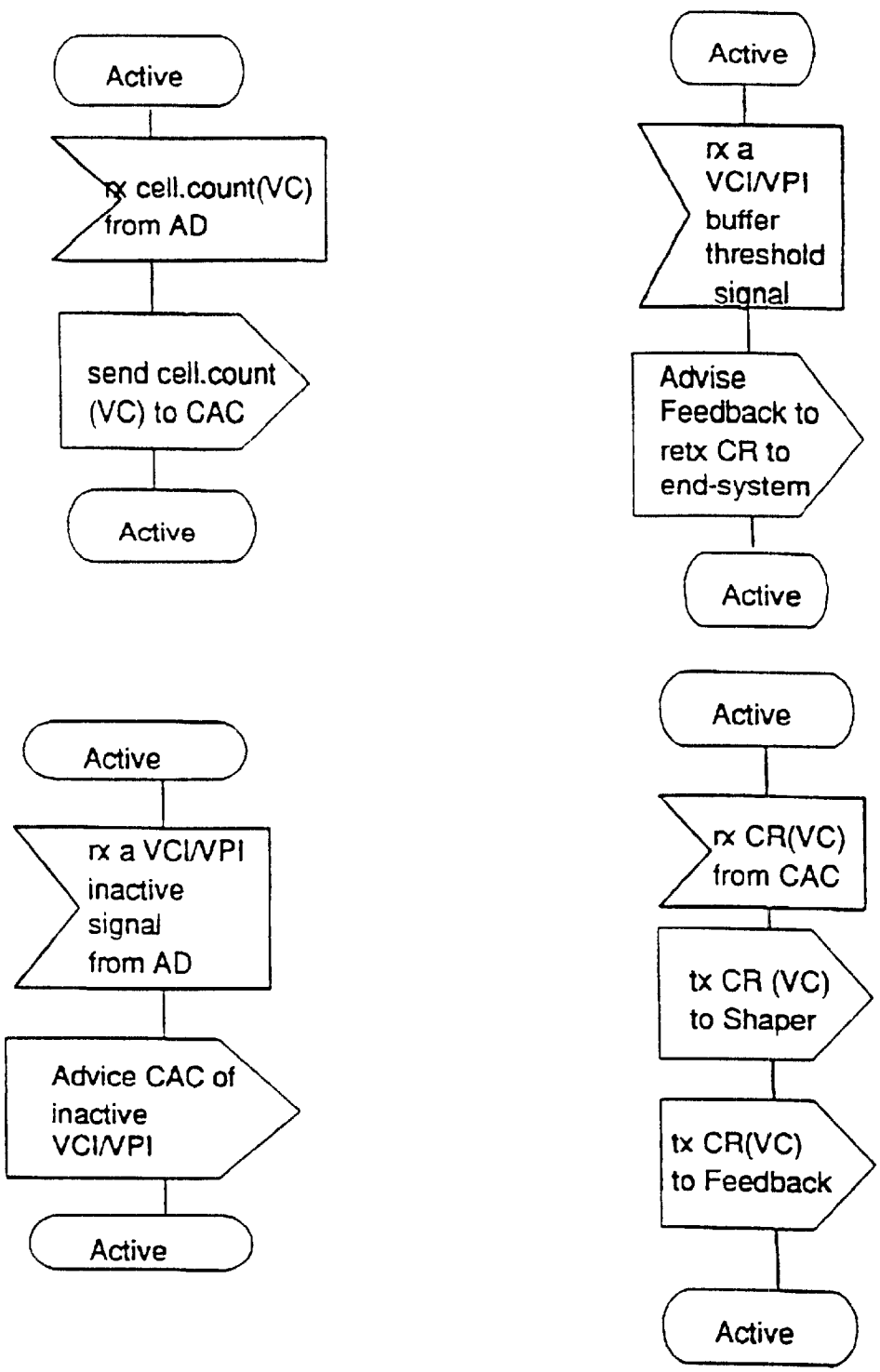

Pseudocode for the controller appears below:

BEGIN {receive an active VPI/VCI from ACTIVITY DETECTOR}
    receive active (VPI/VCI) from ACTIVITY DETECTOR
    send minimum CR to feedback
    send minimum CR to shaper
    send bandwidth request (VPI/VCI) to CAC
    send start.cell.count to ACTIVITY DETECTOR
END
BEGIN {receive a cell.count from AD}
    receive a cell.count from ACTIVITY DETECTOR
    send cell.count to CAC
END
BEGIN {receive a VPI/VCI buffer threshold signal}
    receive a VPI/VCI buffer threshold signal
    signal feedback to retrausmit CR to end-system
END
BEGIN {receive a CR from CAC}
    receive a CR from CAC
    send CR to shaper
    send CR to feedback
END
BEGIN {receive an inactive signal}
    receive an inactive signal
    advise CAC of inactive VPI/VCI
END SDLs for the controller are shown in FIGS. 6-1 and 6-2.

The controller 38 is arranged to write a DBC, VPI/VCI identity value pair into the feedback module 44. It is also arranged to instruct the feedback module 44 to issue a resource management command for a specific VPI/VCI value pair. This instruction may also contain an appropriate CR pair T, τ, (T is an average cell inter-arrival time and τ is a burst tolerance). It should be noted that only one change in the values specified in an RM cell is sent for each new VPI/VCI value pair whenever the CAC updates the CR value. Typically, this may be once every 30 seconds or more in a public network, and depends upon the sensitivity setting of the activity detector in the DEC 20. It follows that the required feedback control bandwidth can be relatively small.

As will be seen from the pseudocode, the controller 38 receives signals from the buffer module 40 whenever a buffer fill threshold is reached by cells having a specific VPI/VCI value pair.

The interface with the activity detector 36 has already been described.

The purpose of the feedback module 44 will now be described briefly.

As mentioned above, the feedback module 44 transmits current CR values (as signalled by the controller 38) to the end-system via output 35. The CR is transmitted using a resource management cell as shown in FIG. 7. Optionally, one field of this cell is the DBC identity value which is used to enable an end-system 14 (see FIG. 1) to distinguish between CR advices from different DBCs (e.g. DBCs 20-1 and 20-2 as shown in FIG. 2) in the end-system to end-system path. This DBC identity field is indicated as field 50 in FIG. 7. The CR is placed in field 52. This RM cell, like other cells, has a five octet header which contains a PT field 54 indicating that the cell is a resource management (RM) cell.

It is proposed that, if used, DBC identity values are not fixed but are chosen at the time of setting up the transmission path through the network for a given a VPI/VCI value pair. This implies that the CAC 18 assigns a value for the DBC identity for each VPI/VCI value pair, and the feedback module 44 maintains a table of (DBC, VPI/VCI) identity pairs. For example, in FIG. 2, public network 10-1 is arranged to choose a DBC identity for a given VPI/VCI pair and signals this information forwards so that public network 10-2 does not chose the same value (e.g. public network 10-1 assigns identity 1, public network 10-2 assigns identity 2, etc). The DBC identity value is stored in a table maintained by the feedback module 44.

The CR field 52 in the RM cell (see FIG. 7) contains the CR advice from the CAC which is provided as the average cell inter-arrival time T, plus a burst tolerance i.

Operation of the feedback module 44 is triggered by the controller 38 (a) when a new CR is advised by the CAC 18, and (b) when the buffer fill level in buffer module 40 corresponding to any VPI/VCI value pair rises above the buffer fill threshold. A resource management (RM) cell is then sent to the end-system.

Figure 8:
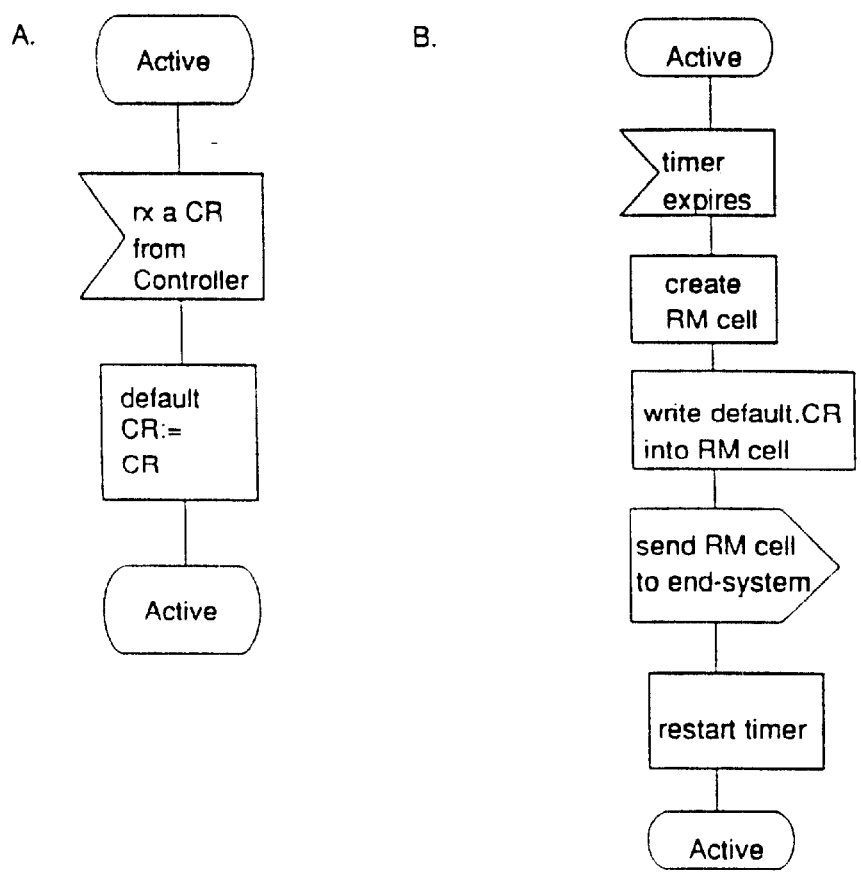
FIG. 8 is an SDL for the feedback module of FIG. 4.

The pseudocode for the feedback module 44 is as follows and the corresponding SDL is shown in FIG. 8.

```
BEGIN {Receive a CR}
    receive a CR for a VPI/VCI from Controller
    default_CR:=CR
END {Receive an CR}
BEGIN {RM.cell timer expires}
    RM.cell timer expires
    create RM.cell
    write default.CR into RM.ceil
    send RM.cell to end-system
    restart RM.cell timer
END {cell arrival from network}
```

Next the buffer module 40 will be considered.

The buffer module is shown in more detail in FIG. 9. Its purpose is to store incoming data cells on the basis of the VPI/VCI value pairs contained in the cells. Buffering the cells allows an end-system 14 (FIG. 1) time to respond to a feedback signal from module 44. Another function of the buffer module 40 is to send a signal to the controller 38 when the buffer fill threshold is reached, indicating that an end-system is not responding to a feedback signal (this in turn causes the controller 38 to re-send a cell rate signal (CR) to the end-system, as mentioned above). The buffer module 40 also drops received cells when the maximum buffer allocation for a given VPI/VCI value pair is exceeded. This is done by buffer overflow.

The size of buffer required for a DBC 20 controlling access to the switching system 10 could be relatively small. For example, if the DBC 20 has a combined input rate from all sources of 150 Mbit/s, then, if the round trip delay to the end-system is 100 µs, there will be less than 35 cells in flight whenever the CR values are changed.

The size of the shared memory area 56 is mainly to cater for changes in the burst tolerance, because a change in this rate leads to only a small number of excess cell arrivals (e.g. around 35 cells). The fixed cell positions assigned to respective VPI/VCI value pairs are designated by the reference numeral 58 in FIG. 9. The cells in these positions represent the front cells of a plurality of queues, each queue having its own VPI/VCI value pair. In other words, the queues can be visualised as running horizontally in FIG. 9 with the front cells at the right hand side. Cells arriving in the buffer module 40 are placed in the queues in a first-in, first-out (FIFO) order.

Cells are removed from the buffer module 40 when an appropriate signal is received from the shaper section of the shaper/multiplexer module 42, as defined by the buffer module pseudocode which follows:

```
BEGIN {Receive a cell}
    receive a cell
        put cell in buffer
        IF buffer-fill level=Threshold THEN
            transmit buffer-fulll signal to CONTROLLER
        ELSE
            do nothing
END {Receive a cell}
BEGIN {Receive a fetch}
    receive a VPI/VCI fetch signal from the SHAPER/
        MUX
    pass cell from buffer to the SHAPER/MUX
    decrement buffer-fill level
END {Receive a fetch}
```

Figure 10:
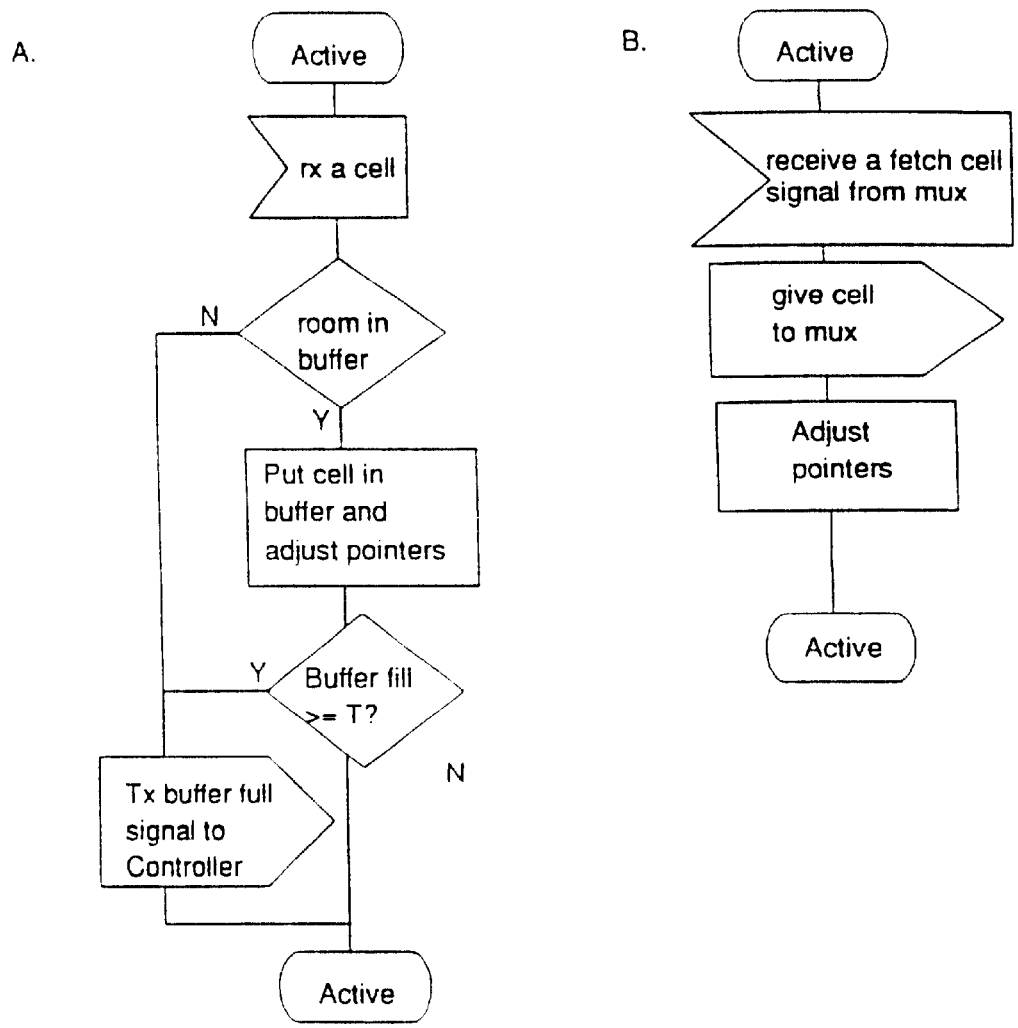
FIG. 10 is an SDL for the buffer.
Figures 1, 12:
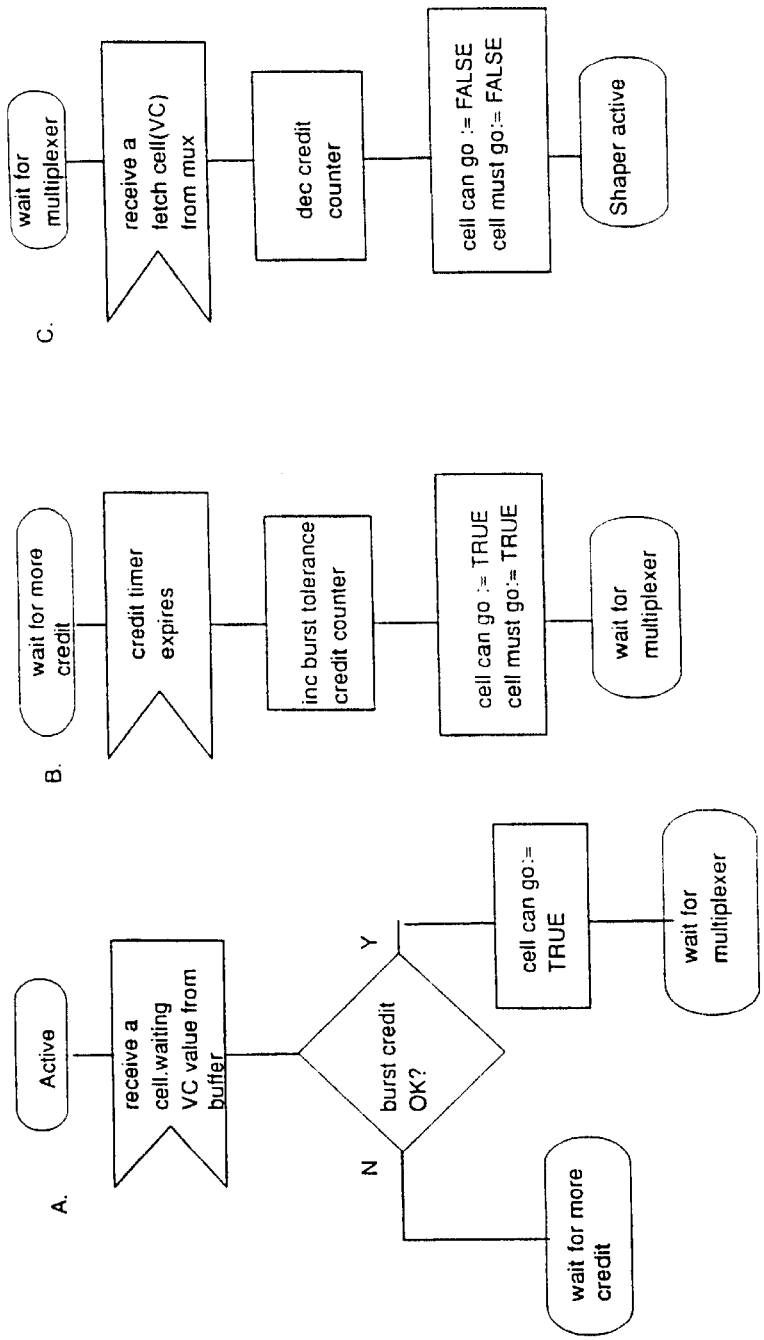
Figures 2, 12:
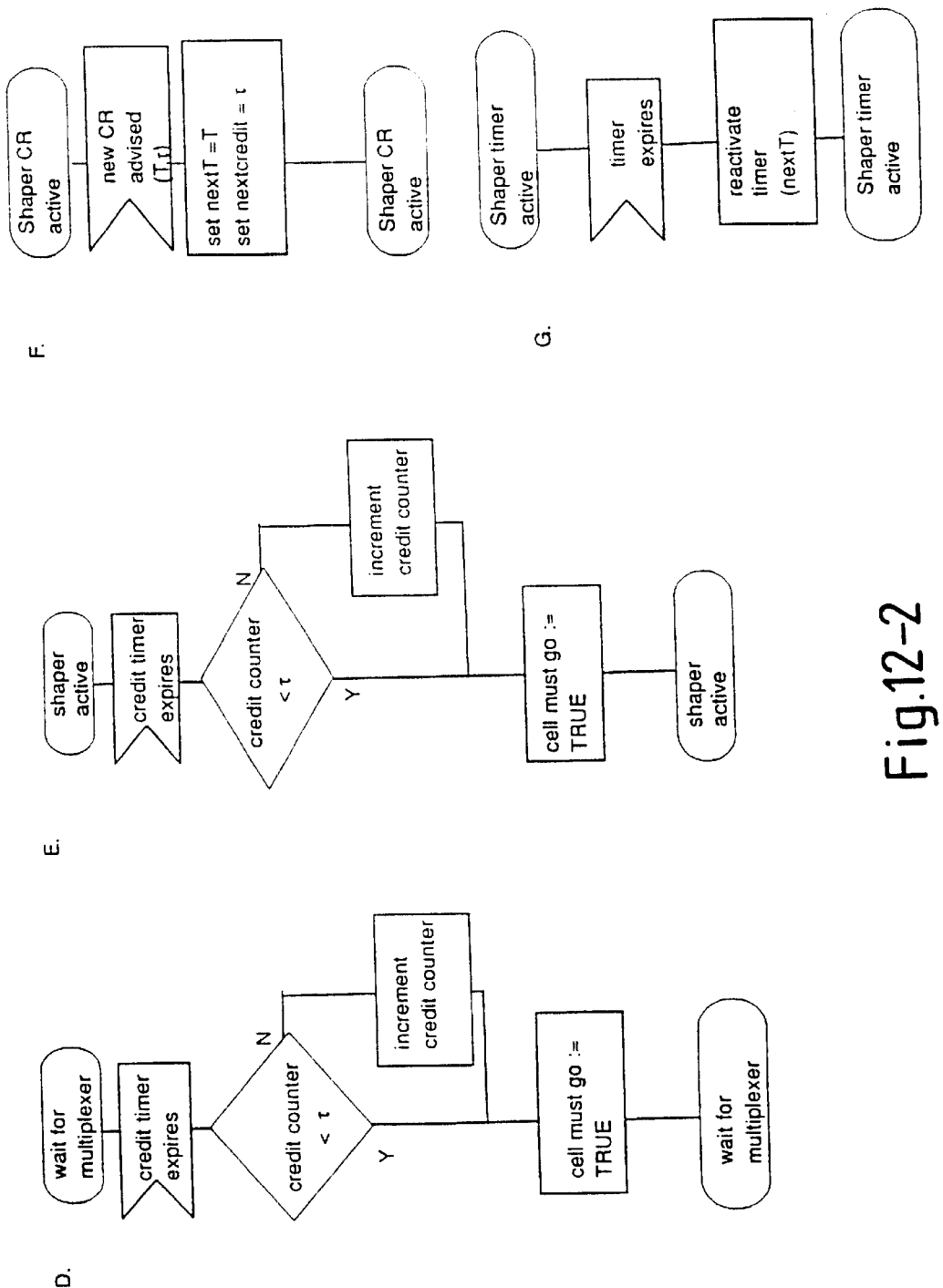
Figures 3, 12:
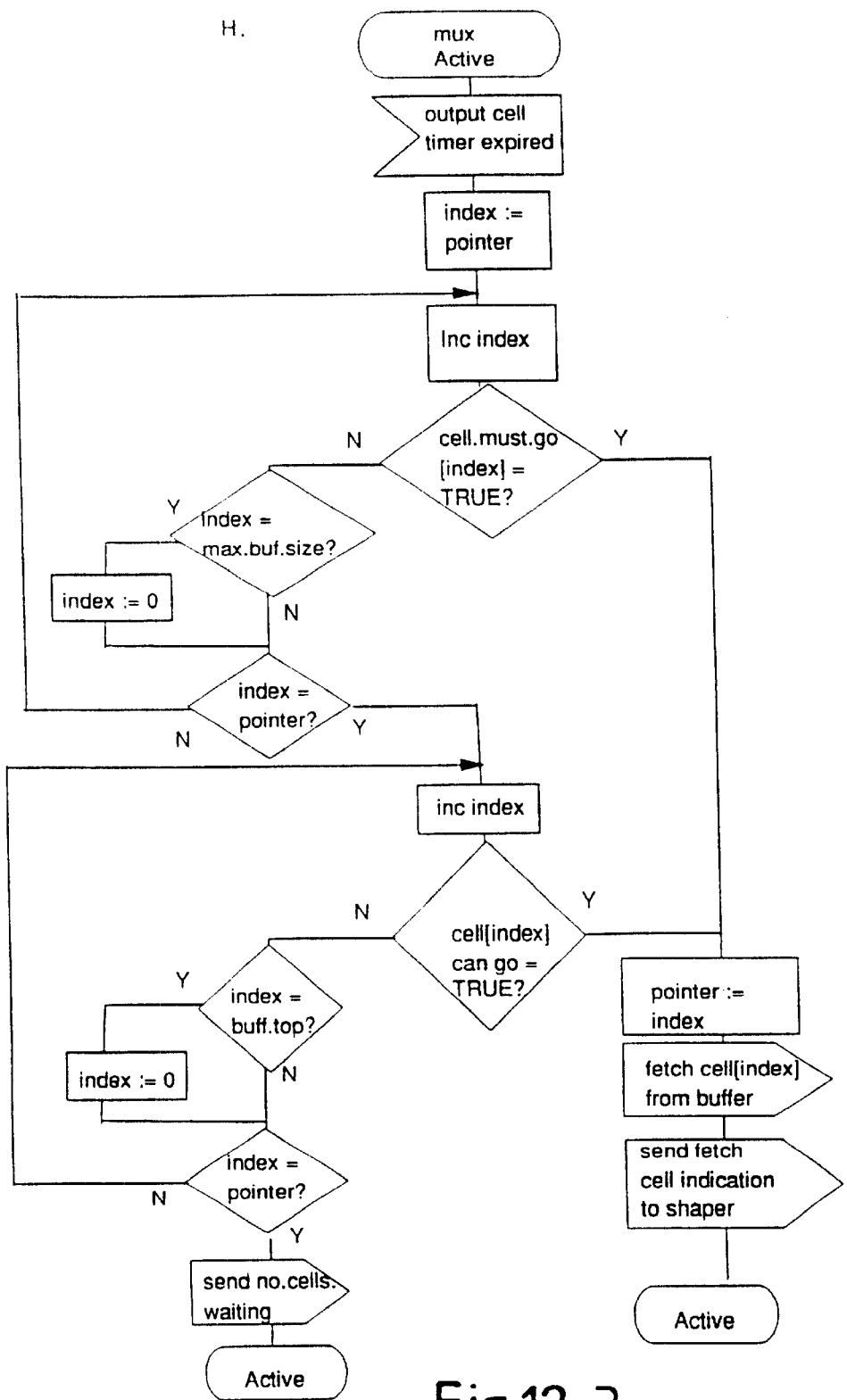

The corresponding SDL appears in FIG. 10.

Referring now to FIG. 4 in combination with FIG. 11, the shaper/multiplexer module 42 operates to remove cells from the buffer module 40 and to transmit them onwards towards their destination via the network switches. Module 42 has two parts which are a multiplexer 60 and a shaper 62. For each VPI/VCI value pair, the shaper 62 maintains a cell rate (CR) value and a timer.

The cell stream fed to output 32 is shaped by the shaper so that bursts which are not greater than the burst tolerance τ pass without being delayed by the shaper 62. However, the multiplex function may delay a cell if several transmissions represented by different VPI/VCI value pairs are bursting simultaneously. In this case, the multiplexer 60 assigns each active VPI/VCI value pair a fair share of the DBC output bandwidth. It does this by polling active VPI/VCI value pairs in a round-robin fashion. Cells which are waiting for a period equal to or greater than the rate interval T are flagged with a higher priority "cell must go" value. The multiplexer picks up these cells first (see FIG. 11). Cells will be forced to wait by the shaper function if bursts arrive which are longer than the burst tolerance credit value. The detailed operation of the shaper/multiplexer module 42 will become apparent from the following pseudocode:

```
1. BEGIN {STATE=ACTIVE}
       receive a cell.waiting[VPI/VCI] signal from buffer
       IF burst credit ok THEN
           cell.can.go:=TRUE
           STATE:=WAIT for multiplexer
       ELSE {burst credit not ok}
           STATE:=WAIT for credit timer to expire
   END
2. BEGIN {STATE=WAIT for credit timer to expire}
       credit timer expires
       increment burst tolerance credit counter
       cell.can.go:=TRUE
       cell.must.go:=TRUE
       STATE:=WAIT for multiplexer
   END
3. BEGIN {STATE=WAIT for multiplexer}
       receive a fetch.cell[VPI/VCI] from multiplexer
       decrement credit counter
       cell.can.go:=FALSE
       cell.must.go:=FALSE
```

```
    STATE:=ACTIVE
  END
4. BEGIN {STATE=WAIT for multiplexer}
    credit timer expires
    IF credit counter<τ THEN
       increment credit counter
    ELSE
       do nothing
       cell.must.go:=TRUE
  END
5. BEGIN {STATE=SHAPER ACTIVE}
    credit timer expires
    IF credit counter<τ THEN
       increment credit counter
    ELSE
       do nothing
       cell. must.go:=TRUE
  END
6. BEGIN {STATE=SHAPER.CR ACTIVE}
    new CR advised (T, τ)
    nextT:=T
    nextcredit:=τ
  END
7. BEGIN {STATE=SHAPER TIMER ACTIVE}
    timer expires
    reset timer (nexT)
  END
8. BEGIN {STATE=MULTIPLEXER ACTIVE}
    output cell timer expires
    index:=pointer
    REPEAT {1st loop of searching for cell.must.go}
       increment index
       IF cell.must.go[index] THEN
          pointer:=index
          fetch cell[index] from buffer
          send fetch cell signal to SHAPER
          STATE:=MUX.ACTIVE
       ELSE
          IF index=max.buffer.size THEN
             index:=0
    UNTIL index=pointer
    REPEAT {2nd loop of searching for cell.can.go}
       increment index
       IF cell.can.go[index] THEN
          pointer:=index
          fetch cell[index] from buffer
          send fetch cell signal to SHAPER
          STATE:=MUX.ACTIVE
       ELSE
          IF index=max.buffer.size THEN
             index:=0
       UNTIL index=pointer
       send no.cell.waiting.signal
  END
```

When the CAC 18 receives a bandwidth request from the controller 38, it must first determine whether sufficient bandwidth is available to allow the file to be sent within the pre-registered maximum time. If sufficient bandwidth is not available, bandwidth is "robbed" from other users as described below. Confirmation of allocated bandwidth is then sent to the controller 38 which forwards the bandwidth allocation to the end-system via the feedback module 44.

The CAC 18 periodically receives a cell count signal (as described above) from the controller 38 which is used by the CAC 18 to monitor how much of the transmission has been sent (and how much is still to be sent). The bandwidth which will be required to allow the transmission to be sent in time can then be reassessed in the light of the cell count. It will be understood that even though sufficient bandwidth is given to the end-system the end-system may "fall behind" if it does not use all of the bandwidth allocated to it. In this case, the CAC 18 will offer a greater bandwidth to allow the end-system to "catch up".

The CAC 18 also stores information relating to the maximum transmission rate of the end-system. Thus, the CAC 18 will not allocate more bandwidth than the end-system is able to use. Once the CAC 18 has calculated that the maximum bandwidth must be allocated to an end-system until the end of the job, that bandwidth is tagged as "do not rob" to prevent bandwidth being removed which would make it impossible to meet the maximum transmission time deadline.

It will be understood that when the DBC 20 requests a change in the bandwidth allocated to a particular transmission, the CAC must control other traffic in the network so that the network capacity is used most effectively. The description which follows deals with connection admission control methods for overcoming the problem of traffic rebalancing.

Two connection admission control strategies will now be described. Both tackle the problem of rebalancing traffic. In other words, when a transmission becomes quiet or newly active, it is necessary to determine how many other control messages need to be generated for other transmissions. The object is to make this number of control messages as small as possible.

The first strategy involves a relatively simple connection admission control method which involves no actual rebalancing. In this method, a newly active transmission (VPI/VCI value pair) is given a single sustained cell rate (CR) which is retained until the transmission goes quiet again. Only when it is subsequently reactivated will the transmission get a different CR. This means that a quiet signal relating to one VPI/VCI value pair will cause no control signals to be generated for other VPI/VCI value pairs which were sharing capacity with it.

This is combined with a filling method which involves (i) giving a first newly active connection an effective capacity which is half of the total available capacity; (ii) giving the next newly active connection an effective capacity which is half of the remaining capacity; (iii) giving the next newly active connection an effective capacity which is half of the still remaining capacity; and so on. This method is applied link-by-link over the entire route identified by the VPI/VCI value pair, and whichever yields the lowest effective capacity is the determinant of the CR fed back to the DBC 20.

It follows that a newly active signal having one VPI/VCI value pair generates no control signals for the other VPI/VCI value pairs which are sharing the capacity.

Since the DBC 20 is designed such that a user can only maintain a large effective capacity on the network so long as the VPI/VCI value pair remains in the active state in the activity detector 36 (FIG. 4), and the cell rate generated by the customer is close to the effective bandwidth value (refer to the cell-counting function of the activity detector described above), it follows that users can only hold onto large effective bandwidths for as long as they are prepared to be charged for the proportionally larger loads which they are submitting.

This method is fair to users in the sense that, over a sufficiently long period, no user is systematically given a poorer capacity.

However, it is desirable in some circumstances to increase the number of users who are able to secure relatively large bandwidth allocations and this can be catered for by a second, modified method as follows.

In this case the underlying principle is that, if an active signal causes control signals for other VPI/VCI value pairs, let the signal be limited to only one per link, namely the richest (largest capacity) VPI/VCI value pair. This can be described as a limited rebalancing method or a "take-only-from-the-richest" (Robin Hood) method.

This can best be illustrated with an example filling method:

(i) the first newly active VPI/VCI value pair is assigned an effective capacity equal to half of the total available capacity;

(ii) the next newly active connection is assigned half of the remaining capacity plus a fifth of the effective capacity of the first VPI/VCI value pair (i.e. the current richest);

(iii) the next newly active connection is assigned half of the remaining capacity plus one fifth from the current richest; and so on.

To illustrate this process, it may be imagined that there is a single link with a capacity of 100 Mbit/s. The above steps then result in the following exemplary steps:

(i) the first newly active VPI/VCI value pair gets 50 Mbit/s and there is 50 Mbit/s remaining;

(ii) the next VPI/VCI value pair gets half of the remainder (which yields 25 Mbit/s) plus a fifth from the first, which means that the first now has 40 Mbit/s, and the second has 35 Mbit/s;

(iii) the next VPI/VCI value pair gets half of the remainder, which yields 12.5 Mbit/s plus a fifth from the first, so that the first now has 32 Mbit/s, the second still has 35 Mbit/s, the third has 20.5 Mbit/s, and so on.

Note that more of the users are now getting large capacities, but there is only one extra control message to send on the link. There is thus a limited rebalancing or "Robin Hood" strategy.

To extend the method to a route with many links, the above process is repeated link-by-link. Whichever link yields the lowest effective capacity is the determinant of the CR value sent back to the DBC. Now, using this value of effective capacity, the CAC assigns it link-by-link by taking half of the remaining capacity on that link, and any extra which is needed is taken from the richest VPI/VCI value pair on that link. Consequently, this generates at most one additional CR control message per link for each VPI/VCI active signal sent to the network. A quiet signal still generates no additional control messages.

This strategy also makes it impossible for a user to hold onto a very large capacity when others become active. In addition, as many users as possible are given a reasonably large capacity while keeping the complexity of traffic rebalancing to a minimum.

In summary, there is provided a broadband switching system for the switching of asynchronously transferred cells of data, a dynamic bandwidth controller (DBC) controls the application of data cells to an input port of the system, the data cells being supplied by a number of transmitting end-systems.

When an end-system begins transmitting data cells, the DBC detects the presence of incoming cells and requests bandwidth from a CAC forming part of the system.

The switching system stores a table associating a number of signal sources connected to the input port with respective predetermined maximum transmission times and maximum transmission rates for the sources. When arrival of cells at the input port from one of the source is detected, the DBC and CAC operate together to allocate sufficient bandwidth in the switching system to allow the respective message size to be transmitted within the respective maximum transmission time. A guaranteed minimum rate of transmission is also guaranteed for the source.

What is claimed is:

1. A broadband switching system comprising:

at least one ingress for connection to a respective signal source and at least one egress for connection to a selected signal receiving system;

at least one switch for transmission information-carrying asynchronously transferred data cells carrying customer traffic from the ingress to the egress, system control means for accepting and establishing a communication channel between the ingress and the egress via the said switch, and bandwidth control means arranged to detect data cells received at the ingress for transmission along said communications channel, and, automatically in response to such cell detection, to cause the system control means to increase the bandwidth allocated to said channel to a level sufficient to permit transmission of a predetermined number of cells within a predetermined time period;

said bandwidth control including feedback means arranged to transmit a maximum output cell rate signal back to the signal source indicating a cell rate which is a function of the allocated bandwidth.

2. A system as in claim 1 wherein said bandwidth control means comprises:

table storing means for storing a table associating said predetermined time period with said signal source, said predetermined time period being a predetermined maximum transmission time for a message comprising a group of said predetermined number of cells, and means for recognizing the source of said detected cells thereby to identify the maximum transmission time associated with the detected cells.

3. A system as in claim 2 wherein:

the storing means is arranged for storing a table further including a message size value, the size value being associated with a respective signal source and being a predetermined maximum number of cells which form a message.

4. A system as in claim 2 wherein:

the storing means is arranged for storing a table further including a bandwidth value, the bandwidth value being a predetermined maximum bandwidth allocation associated with a respective signal source.

5. A system as in claim 2 wherein:

the maximum transmission time is calculated according to a predetermined finishing time for the transmission of a message to the egress.

6. A system as in claim 2 wherein:

the bandwidth control means is arranged periodically to monitor the number of cells of a particular message that have already been sent and to communicate a corresponding cell count to the system control means.

7. A system as in claim 2 wherein:

the system control means is arranged to calculate the bandwidth required to permit transmission of a message in the time period associated with the recognized signal source.

8. A system as in claim 2 wherein:

the bandwidth control means is arranged to detect periods of inactivity for a signal source, to measure the length of such inactive periods and to deem cells received at the ingress following a period of inactivity which exceeds a predetermined timeout period, to be the beginning of a new message.

9. A bandwidth control for use in a broadband ATM switching system, said bandwidth control comprising:

means for detecting ATM data cells carrying customer traffic received at a system ingress; and means for automatically, in response to such cell detection to cause the system to increase bandwidth allocated thereto to a level sufficient to permit transmission of a predetermined number of cells within a predetermined time period;

said means to increase bandwidth including feedback means arranged to transmit a maximum output cell rate signal back to a source of the detected data cells indicating a cell rate which depends on the allocated bandwidth.

10. A method of operating a broadband switching system for transmitting information-carrying asynchronously transferred data cells carrying customer traffic from an ingress of the system to an egress of the system via at least one switch, the method comprising:

detecting the arrival of data cells from said source at the ingress, automatically in response to such detection, increasing the bandwidth allocated to the cells to a level sufficient to permit transmission of the incoming cells within a predetermined bandwidth; and transmitting an output cell rate back to said source indicating a cell rate which depends on said automatically allocated bandwidth.

\* \* \* \* \*